United States Patent [19]
Noguchi

[11] Patent Number: 5,983,184
[45] Date of Patent: Nov. 9, 1999

[54] HYPER TEXT CONTROL THROUGH VOICE SYNTHESIS

[75] Inventor: Atsushi Noguchi, Yamato, Japan

[73] Assignee: International Business Machines Corporation, Armonk, N.Y.

[21] Appl. No.: 08/902,559

[22] Filed: Jul. 29, 1997

[30] Foreign Application Priority Data

Jul. 29, 1996 [JP] Japan .................................. 8-199319

[51] Int. Cl.[6] .............................. G10L 3/00; G10L 5/02; G10L 9/00
[52] U.S. Cl. ........................ 704/270; 704/275; 704/258; 707/501
[58] Field of Search ..................... 704/270, 275, 704/258; 707/501

Primary Examiner—David R. Hudspeth
Assistant Examiner—Robert Louis Sax
Attorney, Agent, or Firm—Martin J. McKinley

[57] ABSTRACT

The present invention enables a visually impaired user to freely and easily control hyper text. A voice synthesis program orally reads hyper text on the Internet. In synchronization with this reading, the system focuses on a link keyword that is most closely related to the location where reading is currently being performed. When an instruction "jump to link destination" is input (by voice or with a key), the program control can jump to the link destination for the link keyword that is being focused on. Further, the reading of only a link keyword can be instructed.

3 Claims, 6 Drawing Sheets

FIG. 3

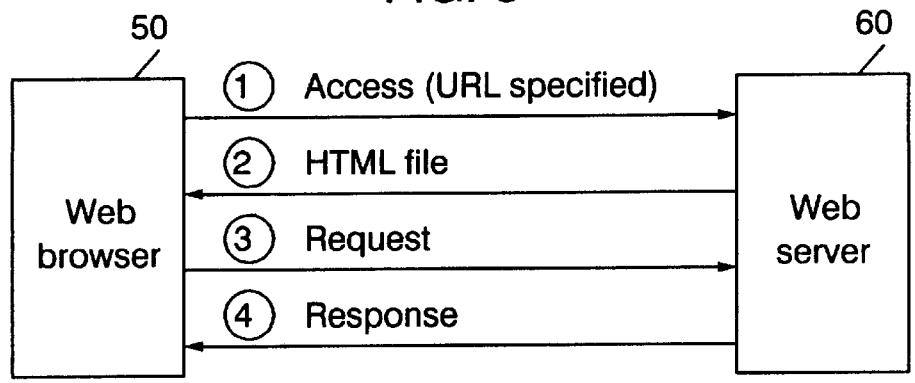

FIG. 4

```
<html>
<TITLE>This is a title</TITLE>
<H1>the picture of Yamato</H1>
<IMG SRC="yamato.gif>
<H2>H2<I>Italics</I>This is</H2>
<H4>H4<I>Italics</I>This is </H4>
<H6>H6<I>Italics</I>This is </H6>
<P>
<UL>
<LI><HREF="THIS.HTM">This is a link keyword</A>
<LI>This is not a link keyword
<LI><A HREF="THAT.HTM">This is<I>a link keyword</I>too</A>
</UL>
<H5>
<A HREF="HTTP.HTM">An HTTP</A> as is indicated by its name
<A HREF="HTML.HTM">HTML</A>transfer protocol
<A HREF="WWW.HTM">that the WWW</A> uses.
</H5>
</html>
```

| Pointer 301 | Position Information 303 | Word 305 | Link Head Flag 307 | Link Flag 309 | Link Destination 311 |
|---|---|---|---|---|---|
| 1 | 1 | This is a title | | | |
| 2 | 8 | the picture of Yamato | | | |
| 3 | 13 | H2 | | | |
| 4 | 18 | Italics | | | |
| 5 | 23 | This is | | | |
| 6 | 25 | H4 | | | |
| 7 | 30 | Italics | | | |
| 8 | 35 | This is | | | |
| 9 | 37 | H6 | | | |
| 10 | 42 | Italics | | | |
| 11 | 47 | This is | | | |
| 12 | 49 | This is a link keyword | * | * | THIS.HTM |
| 13 | 63 | This is not a link keyword | | | |
| 14 | 82 | This is | * | * | THAT.HTM |
| 15 | 85 | a link keyword | | * | THAT.HTM |
| 16 | 94 | too | | * | THAT.HTM |
| 17 | 96 | An HTTP | * | * | THAT.HTM |
| 18 | 100 | is as is indicated by its name | | | |
| 19 | 110 | an HTML | * | * | HTML.HTM |
| 20 | 114 | transfer protocol | | | |
| 21 | 126 | that the WWW | * | * | WWW.HTM |
| 22 | 129 | uses | | | |

HYPER TEXT CONTROL THROUGH VOICE SYNTHESIS

CROSS REFERENCE TO RELATED APPLICATIONS

Applicant claims the foreign priority benefits under 35 U.S.C. 119 of Japanese Application No. 199319, which was filed Jul. 29, 1996. This Japanese application and its translation are incorporated by reference into this application.

FIELD OF THE INVENTION

The present invention relates to a voice synthesis system, or more specifically, to a method for detecting a word included in a sentence of hyper text, and for synthesizing voices in accordance with a voice attribute related to that word type; and a method for determining the type of word included in a sentence to be read and for controlling voice synthesis in accordance with that word type.

BACKGROUND OF THE INVENTION

A conventional voice synthesis program (or a voice synthesizer) reads an input text file having a voice attribute so described that its voice synthesis program can be processed.

For a voice synthesis program called "ProTALKER/2" ("ProTALKER" is a trademark of the IBM Corp.), a word called a "text embedded command/voice attribute" is embedded in text to control a voice attribute at the time of reading.

Assume that the text in which an embedded command is embedded is: "Normal reading first. [*S9] Reading speed is increased here. [*P9] Voice pitch is changed to high. [*S0P0] Reading speed becomes slower with lower voice. [*Y0] Robot reading. [*S=P=Y=] Reading is returned to normal. [*F1] This is the phone number information. [*M1] Tell me the phone number of Mr. Kouichi Tanaka."

Upon receipt of this text, a voice synthesis apparatus recognizes "[*" as the head of the embedded command for instructing a voice attribute, and "]" as the termination of the embedded command. Since the above text does not designate a voice command, it is read as a default. Then, the embedded command [*S9] is detected and the reading speed is set to 9. Following this, upon the detection of [*P9], the voice pitch is set to 9, and upon the detection of [*S0P0], the reading speed and the voice pitch are set to 0. Further, upon the detection of [*Y0], the intonation is set to 0, and upon the detection of [*S=P=Y=], the reading speed, the voice pitch and the intonation are reset to normal. Sequentially, upon the detection of [*F1], text is read using a female voice, and upon the detection of [*M1], text is read using a male voice.

Changes for a plurality of attributes can be included in a single embedded command using the style format [*<attribute symbol 1><set value 1><attribute symbol 2><set value 2> . . .]

The contents of the embedded commands for instructing voice attributes are as follows.
* Change in speaking speed
 The speed is changed at the point where a command is encountered. Set symbol S; ten levels of set value, 0 (slow) to 9 (fast) (normal speed is 5).
* Change in voice pitch
 The pitch is changed at the point where a command is encountered. Set symbol P; ten levels of set value, 0 (low) to 9 (high) (normal pitch is 2).
* Change in voice gain
 The gain is changed at the point where a command is encountered. Set symbol G; ten levels of set value, 0 (small) to 9 (great) (normal gain is 9).
* Change in intonation
 The intonation is changed at the point where a command is encountered. Set symbol Y; ten levels of set value, 0 (no intonation) to 9 (maximum intonation).
* Male voice
 The voice is changed to a male voice at the point where a command is encountered. Set symbol M; set value 1.
* Female voice
 The voice is changed to a female voice at the point where a command is encountered. Set symbol F; set value 1.

Conventionally, a technique exists for synthesizing a data file containing such voice attribute information from a text file including text attributes (style, font, underlining, etc.).

In Japanese Unexamined Patent Publication No. Hei 6-223070, for example, a method is disclosed for converting text attributes (style, font, underlining, etc.) of an input text file into voice attributes (speed, volume, etc.) by using a text-voice attribute conversion table, and for producing a speed command containing an embedded command for the voice attributes.

In addition, in Japanese Unexamined Patent Publication No. Hei 6-44247 is disclosed a method for referring to a control signal-voice synthesis signal conversion table to convert a text control signal in an input text file into a voice synthesis control signal having voice attributes.

These techniques enable the reading of a text while changes in the text attributes are reflected as voice attributes. During reading, the text attribute changes, which are generally displayed as font changes or as colors on a screen, can be expressed as voice attribute changes (the changes in the volume, pitch, intonation and speed) by a voice synthesis program (text reading program).

There is a demand by users, such as visually handicapped persons who can not use the visual information displayed on a display screen (and who, hereinafter are referred to as visually impaired users), that hypertext programs, such as Web browsers, be prepared for their use.

Conventional hypertext programs (viewers for on-line help and Web browsers) only display text data on screen and do not read the text data aloud.

Although the HTML used on the WWW (World Wide Web) of the Internet can handle voice data, advance preparation of such voice data is necessary, and since voice data takes several forms such as AU, WAV, RA, etc., software and hardware must be prepared for each form. Further, since more data is required for voice than for text, a longer transfer time is required for voice data. At the present, however, as voice data is not yet popular, most of the HTML data is provided as sentence data. But when the WWW data becomes available orally, that will be convenient.

Another demand is that not only the information currently displayed on a screen be orally reproduced, but that a visually impaired user who so desires can also easily and freely perform Web surfing while using the voice information that is provided by orally.

In Japanese Unexamined Patent Publication No. Sho 63-231493 is disclosed a related method for additionally inputting headline code at the beginning of each headline for input sentences, and for synthesizing only the contents of the headlines for voice reproduction during a fast forward and a fast reverse.

In Japanese Unexamined Patent Publication No. Hei 3-236099 is disclosed a method whereby an analysis result of a plurality of phrases is stored, and the analysis result is output in accordance with a control command that specifies a reading position in a sentence and voice output, so that the reading position can be indicated exactly.

It is therefore one object of the present invention to provide a system for identifying in text a word type that has a specific feature, and for synthesizing while following the control procedures relevant to the word type.

It is another object of the present invention to provide a system by which a visually impaired user is enabled to freely and easily control hypertext.

SUMMARY OF THE INVENTION

When the above described "text attribute/voice attribute conversion" method is employed, a special word included in text can be orally read for identification. According to one aspect of the present invention, a system identifies a position where a voice synthesis program orally reads hyper text on the WWW of the Internet. Synchronized with the reading of the sentence, a link keyword focuses on those data that are most relevant to the location at which the reading is currently being performed.

In a period following the reading of a specific keyword that continues until the reading of the next keyword begins, the focus is on the specific keyword that was read. When an instruction to "jump to a link destination" is input during this period, the link keyword can be designated, and the process can jump to the link destination for the keyword.

A word that has a link attribute (a link keyword) can be distinguished from another word by regarding it as a different voice attribute, or by inserting a sound (including a voice) designating a link keyword. Thus, while listening to sound without looking at the screen, only a simple manipulation is required to cause the reading process to jump to the link destination, and the reading of hyper text can continue. With this technique, a visually impaired user, such as a visually handicapped person, can easily use the Internet.

According to one aspect of the present invention, a method for controlling a hyper text including a plurality of link keyword, wherein each of the link keyword is related to a link destination information, comprises the steps of: (a) producing a word list managing information for specifying the link keyword and position information for specifying a position of the link keyword in the hyper text; (b) producing voice synthesis input information by converting the hyper text; (c) synthesizing the voice synthesis input information; (d) obtaining a voice synthesis pointer information related to a position in the hyper text related to a position currently synthesized; (e) determining a related link keyword by searching a position information in the hyper text related to the voice synthesis pointer information in the word list; (f) detecting user input instructing to jump to a link destination; and (g) accessing, in response to the user input, to a link destination by using link destination information related to the related link keyword.

The "information for specifying a link keyword" may be any information employed for specifying a special word, such as information for a pointer 301 in FIG. 6 indicating the location of a word in hyper text, position information 303 in FIG. 6 for a special word, or the name of a special word. Although the "hyper text" is preferably a single text object included in the hyper text, it may be a set of hyper text objects having a constant depth. The "position information for specifying a position of a link keyword in hyper text" may be information that enables the position of a link keyword to be identified, such as the location of the word or the block from the head, or the location of the keyword. The "word list" is not necessary a table described in the preferred embodiment of the present invention, and can take any form so long as the system can specify a link keyword and can identify the position of the link keyword.

The "voice synthesis input information" refers to a concept corresponding to an embedded command file in the preferred embodiment of the present invention. This information includes a file in which is embedded no voice attribute information so long as the command file has an appropriate form for synthesizing. The "position in hyper text related to the position currently synthesized" is not necessarily information indicating the exact position currently synthesized, and may be information that is to a degree erroneous. The "voice synthesis pointer information related to the position in hyper text related to the position currently synthesized" can be obtained not only from position information embedded in an embedded command, but also by measuring the amount of information, such as the number of words, for which voice synthesis (including an intermediate process) has been performed, to acquire the voice synthesis pointer.

"Determining a related link keyword" refers to a concept in the preferred embodiment of the present invention that is related to a link keyword located immediately before the one for current voice synthesizing (if such a link keyword is not present, the first link keyword). However, this can be changed in the design stage to a link keyword located immediately after the one for current voice synthesizing (if such a link keyword is not present, the last link keyword). The "user input instructing to jump to a link destination" is input performed not only by depressing a key on a keyboard assigned in advance, by clicking a button icon with a pointing device, or by selection in a pull down menu, but is also input effected by a user's voice. "Accessing to a link destination by using link destination information" can be performed by sending to a data input/output controller a linking instruction in the form of a command to be transmitted by an HTML analyzer to the data input/output controller, or by sending to an HTML analyzer an instruction to access the link destination in the form of information that indicates a link keyword is designated by a user input section.

According to another aspect of the present invention, a method for controlling an HTML file received by a Web server that includes a plurality of link keywords, each of which is related to link destination information, comprises the steps of: (a) receiving the HTML file from the Web server; (b) producing a word list managing information for specifying the link keyword, position information in the HTML file for specifying a position of the link keyword and the link destination information; (c) converting a start tag and an end tag of the link keyword included in the HTML file into voice attribute information, and correlating the voice attribute information as a voice attribute embedded command, with the position information in the HTML file of the link keyword, to produce a voice attribute embedded command file; (d) synthesizing the voice attribute embedded command file; (e) obtaining, in response to a position information related to the link keyword, a voice synthesis pointer information related to a position in the HTML file related to a position currently synthesized; (e determining a related link destination information by searching a position information in the HTML file related to the voice synthesis pointer information in the word list; (g) detecting user input instructing to jump to a link destination; and (h) accessing, in response to the user input, to a link destination by using the related link destination information.

According to an additional aspect of the present invention, a method for synthesizing a sentence including a plurality of special words, comprises the steps of: (a) producing a word list managing information for specifying the plurality of special words and position information for specifying a position of the plurality of special words in the sentence; (b) producing voice synthesis input information by relating a voice attribute with each of the special words, and by converting the sentence; (c) synthesizing the voice synthesis input information; (d) obtaining a voice synthesis pointer information related to a position in the sentence related to a position currently synthesized; (e) determining a special word related to a position currently synthesized by searching a position information in the sentence related to the voice synthesis pointer information in the word list; (f) detecting user input instructing to change the voice synthesis position; (g) obtaining, in response to the user input, from the word list a position information for special word adjacent to a specific word related to a position currently synthesized; and (h) synthesizing at a position related to the position information adjacent to the special word.

According to a further aspect of the present invention, an apparatus for controlling a hyper text including a plurality of link keywords, wherein each of the link keyword is related to a link destination information, comprises: (a) a word list managing information for specifying the link keyword and position information for specifying a position of the link keyword in the hyper text; (b) means for producing voice synthesis input information by relating a voice attribute with the link keyword and by converting the hyper text; (c) means for synthesizing the voice synthesis input information; (d) means for obtaining a voice synthesis pointer information related to a position in the hyper text related to a position currently synthesized; (e) means for determining a related link keyword by searching a position information in the hyper text related to the voice synthesis pointer information in the word list; (f) means for detecting user input instructing to jump to a link destination; and (g) means for accessing, in response to the user input, to a link destination by using link destination information related to the related link keyword.

"Correlating a voice attribute with a link keyword" relates to a voice synthesis embedded command in the preferred embodiment of the present invention, and is a concept that provides for the insertion of a word, which will be explained in the embodiment.

According to still another aspect of the present invention, an apparatus for controlling an HTML file received by a Web server that includes a plurality of link keywords, each of which is related to link destination information, comprises: (a) a communication controller for receiving the HTML file from the Web server; (b) means for producing a word list managing information for specifying the link keyword, position information in the HTML file for specifying a position of the link keyword and the link destination information; (c) means for converting a start tag and an end tag of the link keyword included in the HTML file into voice attribute information, and correlating the voice attribute information as a voice attribute embedded command, with the position information in the HTML file of the link keyword, to produce a voice attribute embedded command file; (d) a voice synthesizer for synthesizing the voice attribute embedded command file; (e) means for obtaining, in response to a position information related to the link keyword, a voice synthesis pointer information related to a position in the HTML file related to a position currently synthesized; (f) means for determining a related link destination information by searching a position information in the HTML file related to the voice synthesis pointer information in the word list; (g) an user input section for detecting user input instructing to jump to a link destination; and (h) means for accessing, in response to the user input, to a link destination by using the related link destination information.

According to a still further aspect of the present invention, an apparatus for synthesizing a sentence including a plurality of special words, comprises: (a) means for producing a word list managing information for specifying the plurality of special words and position information for specifying a position of the plurality of special words in the sentence; (b) means for producing voice synthesis input information by relating a voice attribute with each of the special words, and by converting the sentence; (c) means for synthesizing the voice synthesis input information; (d) means for obtaining a voice synthesis pointer information related to a position in the sentence related to a position currently synthesized; (e) means for determining a special word related to a position currently synthesized by searching a position information in the sentence related to the voice synthesis pointer information in the word list; (f) means for detecting user input instructing to change the voice synthesis position; (g) means for obtaining, in response to the user input, from the word list a position information for special word adjacent to a specific word related to a position currently synthesized; and (h) means for synthesizing at a position related to the position information adjacent to special word.

According to yet another aspect of the present invention, provided is a recording medium to store a program, that is managed by a storage area a data processing system manages, for controlling a hyper text including a plurality of link keyword, wherein each of the link keyword is related to a link destination information, with the program comprising: (a) program code means for instructing the data processing system to produce a word list managing information for specifying the link keyword and position information for specifying a position of the link keyword in the hyper text; (b) program code means for instructing the data processing system to produce voice synthesis input information by relating a voice attribute with the link keyword and by converting the hyper text; (c) program code means for instructing the data processing system to synthesize the voice synthesis input information; (d) program code means for instructing the data processing system to obtain a voice synthesis pointer information related to a position in the hyper text related to a position currently synthesized; (e) program code means for instructing the data processing system to determine a related link keyword by searching a position information in the hyper text related to the voice synthesis pointer information in the word list; (f) program code means for instructing the data processing system to detect user input instructing to jump to a link destination; and (g) program code means for instructing the data processing system to access, in response to the user input, to a link destination by using link destination information related to the specified link keyword.

According to yet an additional aspect of the present invention, provided is a recording medium to store a program, that is managed by a storage area a data processing system manages, for controlling an HTML file received from a Web server including a plurality of link keyword, wherein each of the link keyword is related to a link destination information, with the program comprising: (a) program code means for instructing the data processing system to receive the HTML file from the Web server; (b)

program code means for instructing the data processing system to produce a word list managing information for specifying the link keyword, position information in the HTML file for specifying a position of the link keyword and the link destination information; (c) program code means for instructing the data processing system to convert a start tag and an end tag of the link keyword included in the HTML file into voice attribute information, and to correlate the voice attribute information as a voice attribute embedded command, with the position information in the HTML file of the link keyword, to produce a voice attribute embedded command file; (d) program code means for instructing the data processing system to synthesize the voice attribute embedded command file; (e) program code means for instructing the data processing system to obtain, in response to a position information related to the link keyword, a voice synthesis pointer information related to a position in the HTML file related to a position currently synthesized; (f) program code means for instructing the data processing system to determine a related link destination information by searching a position information in the HTML file related to the voice synthesis pointer information in the word list; (g) program code means for instructing the data processing system to detect user input instructing to jump to a link destination; and (h) program code means for instructing the data processing system to access, in response to the user input, to a link destination by using the related link destination information.

According to yet one further aspect of the present invention, provided is a recording medium to store a program, that is managed by a storage area a data processing system manages, for synthesizing a sentence including a plurality of special words, with the program comprising: (a) program code means for instructing the data processing system to produce a word list managing information for specifying the plurality of special words and position information for specifying a position of the plurality of special words in the sentence; (b) program code means for instructing the data processing system to produce voice synthesis input information by relating a voice attribute with each of the special words, and by converting the sentence; (c) program code means for instructing the data processing system to synthesize the voice synthesis input information; (d) program code means for instructing the data processing system to obtain a voice synthesis pointer information related to a position in the sentence related to a position currently synthesized; (e) program code means for instructing the data processing system to determine a special word related to a position currently synthesized by searching a position information in the sentence related to the voice synthesis pointer information in the word list; (f) program code means for instructing the data processing system to detect user input instructing to change the voice synthesis position; (g) program code means for instructing the data processing system to obtain, in response to the user input, from the word list a position information for special word adjacent to a specific word related to a position currently synthesized; and (h) program code means for instructing the data processing system to synthesis at a position related to the position information adjacent to the special word.

BRIEF DESCRIPTION OF THE DRAWINGS

FIG. 3 is a diagram showing the procedures of the present invention for communication between a Web browser and a Web server.

FIG. 4 is a diagram showing one example of an HTML file that is converted according to the present invention.

FIG. 6 is a diagram showing one example of a word list of the present invention.

DESCRIPTION OF THE PREFERRED EMBODIMENTS

Hardware Arrangement

Figure 1:
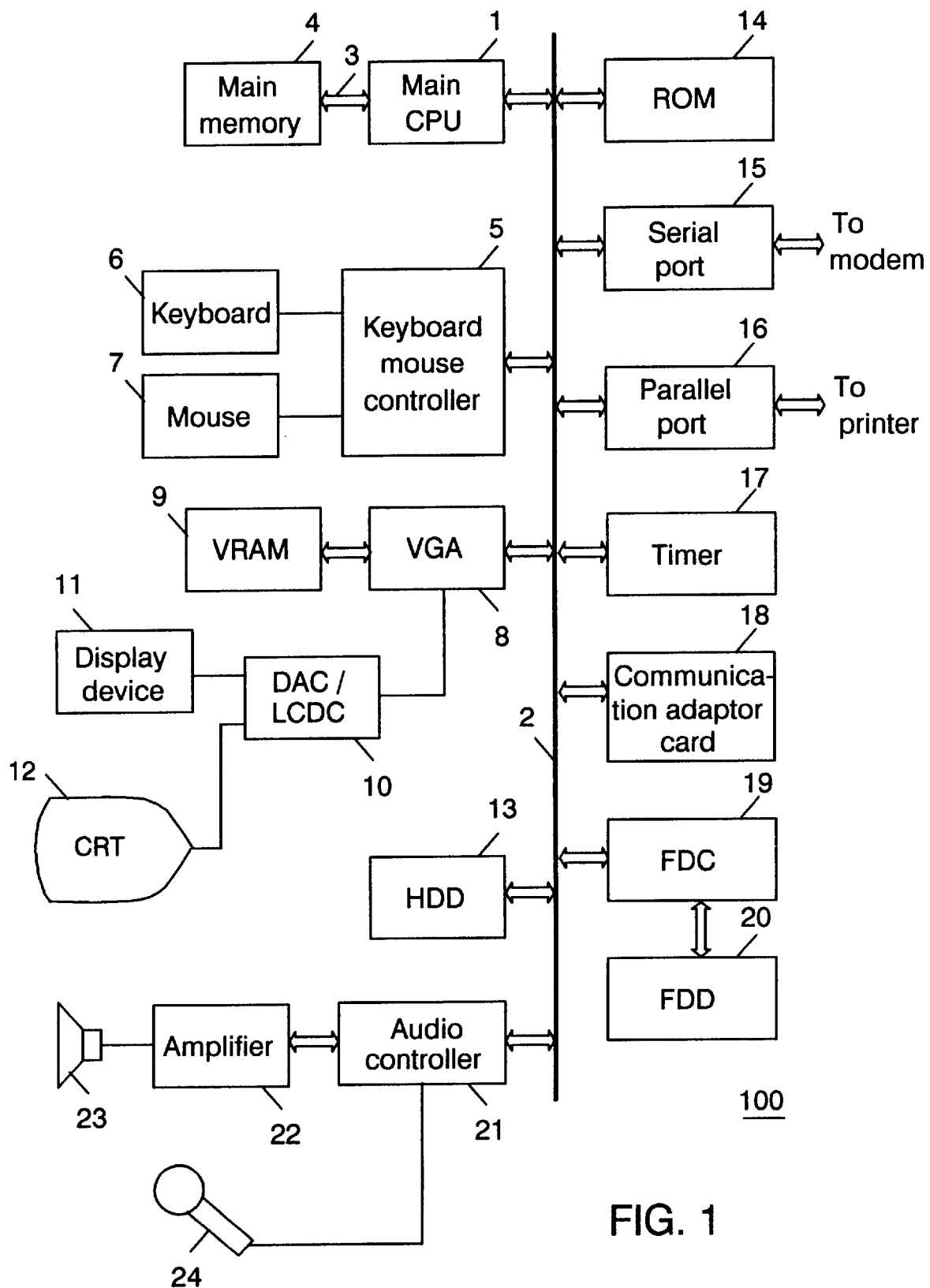
FIG. 1 is a block diagram illustrating a hardware arrangement.

A preferred embodiment of the present invention will now be described while referring to the accompanying drawings. FIG. 1 is a schematic diagram illustrating the hardware arrangement for a voice synthesis system of the present invention. A voice synthesis system 100 includes a central processing unit (CPU) 1 and a memory 4. The CPU 1 and the memory 4 communicate with a hard disk drive 13 as an auxiliary storage device via a bus 2. A floppy disk drive (or a driver for an MO or a CD-ROM) 20 communicates with a bus 2 via a floppy disk controller 19.

A floppy disk (or a medium, such as an MO or a CD-ROM) is inserted into the floppy disk drive (or a driver for an MO or a CD-ROM) 20. On the floppy disk and the hard disk drive 13 and in a ROM 14 are stored code for a computer program that sends commands to the CPU 1, etc., while interacting with an operating system to carry out the preset invention. This code is executed by being loaded into the memory 4. The code for the computer program may be compressed, or may be divided into a plurality of code segments and stored in a plurality of storage media.

The voice synthesis system 100 can be a used as a system that includes user interface hardware. The user interface hardware components are, for example, a pointing device (mouse, joystick, etc.) 7 and a keyboard 6 used for input, and a display 12 used to provide visual data to a user. A printer and a modem can be connected, respectively, via a parallel port 16 and via a serial port 15. The voice synthesis system 100 can communicate with another computer via the serial port 15 and the modem, or via a communication adaptor 18.

A voice signal that is obtained by D/A (digital/analog) conversion at an audio controller 21 is transmitted via an amplifier 22 to a loudspeaker 23, through which the signal is output as a voice. The audio controller 21 can also perform A/D (analog/digital) conversion of voice information received from a microphone 24, and can fetch external voice information into the system.

As is described above, it can be easily understood that the present invention can be implemented by a normal personal computer (PC), a work station, or a combination of them. The above described components are only examples, and not all the components are required for the present invention. Especially, since the present invention is one for supporting a visually impaired user, the components such as a VGA 8, a VRAM 9, a DAC/LCDC 10, a display device 11 and a CRT 12, that are necessary for a user who is provided a visual display are not required. Since instructions for the system can be given orally, as will be described later, the keyboard 6, the mouse 7 and a keyboard/mouse controller 5 are also not required.

It is preferable that the operating system be Windows (a trademark of Microsoft Corp.), OS/2 (a trademark of IBM Corp.), or an X-WINDOW system (a trademark of MIT) on AIX (a trademark of IBM Corp.), all of which support standard GUI multi-window environment. However, the present invention can be implemented in a character based environment, such as PC-DOS (a trademark of IBM Corp.) or MS-DOS (a trademark of Microsoft Corp.), and is not limited to a specific operating system environment.

In FIG. 1 is shown the system in a stand-alone environment. However, the present invention may be implemented as a client/server system wherein a client machine is connected by a LAN to a server machine via Ethernet or a token ring; wherein on the client machine side are provided a user input section that will be described later, a synthesizer for receiving voice data from the server machine and reproducing it, and a loudspeaker; and wherein on the server machine side the other functions are provided. The functions provided on the server machine side and the client machine side can be changed as desired at the design stage. Various modifications for combinations of pluralities of machines and for the distribution of the functions are also included in the present invention.

System Configuration

The system configuration of the present invention will now be described while referring to the block diagram in FIG. 2. In this embodiment, the system comprises a communication controller 110, a Web browser 120 and a voice synthesis unit 150. These components can be independently provided by the hardware arrangement in FIG. 1, or can be provided by a common hardware component.

The communication controller 110 controls communications with another computer, such as a Web server. A detailed description of its functions will be described later.

The Web browser 120 includes a data input/output controller 121, an HTML file storage section 123, an HTML analyzer 125, a user input section 127, a focus controller 129, a word list 131, a display section 133, a conversion table 135, and a focus pointer 139.

The input/output controller 121 accesses a Web server 60 based on information for specifying a URL, and instructs the communication controller 110 to receive a HTML (Hyper Text Markup Language) file from the Web server 60.

The HTML file storage section 123 stores an HTML file that is received by the communication controller 110 and the data input/output controller 121, and an HTML related file such as an image file. The HTML analyzer 125 analyses the HTML file, determines whether a file to be received is still present, and produces the word list 131 and an embedded command file 141.

The focus controller 129 receives position information (voice file information 171) reading is currently performed by the voice synthesis unit 150 and information for the word list 131, and specifies a word that should be currently focused on. The display section 133 displays the contents of a HTML file and the word that is currently focused on. The conversion table 135 is used to convert a keyword in an HTML file into an embedded command for instructing a voice attribute for the reading.

The voice synthesis unit 150 is constituted by a voice synthesis controller 151, a language analyzer 153, a grammar holding section 155, a reading/accent dictionary 157, a reading provider 159, an accent provider 161, a parameter generator 163, a voice synthesizer 165, a voice generator 167, a voice synthesis pointer storage section 169, a voice file storage section 171, and a voice synthesis jump pointer storage section 173.

The voice synthesis controller 151 transmits a sentence (embedded command file) including an embedded command received from the Web browser 120 to the language analyzer 153. The language analyze 153 performs morphemic analysis of the received word by referring to the reading/accent dictionary 157 and the grammar stored in the grammar holding section 155, and divides the input sentence into appropriate morphemes.

The grammar holding section 155 stores the grammar referred to by the language analyzer 153 for the morphemic analysis. The reading/accent dictionary 157 stores "parts of speech," "reading" and "accents" that relate to words including Chinese characters and cursive kana characters.

The reading provider 159 uses the reading information stored in the reading/accent dictionary 157 to determine how to read the respective morphemes that are obtained by the language analyzer 153. The accent provider 161 uses the accent information stored in the reading/accent dictionary 157 to determine the accents for the respective morphemes that are obtained by the language analyzer 153.

In response to the reading determined by the reading provider 159, and the accent determined by the accent provider 161, the parameter generator 163 generates a voice parameter to synthesize at currently designated parameters "speed," "pitch," "volume," "intonation," and "gender." When a voice command indicating the voice attribute is embedded in front of the word currently synthesized, that voice attribute is adopted for the "currently designated parameters." When such a voice command is not embedded, a default voice attribute that is set in the system in advance is adopted for the "currently designated parameters."

The voice synthesizer 165 generates a voice signal in accordance with a voice parameter generated by the parameter generator 143. In the preferred embodiment of the present invention, the generation of the voice signal is realized by the audio controller 21 in FIG. 1 performing the D/A (digital analog) conversion. The voice generator 167 generates a voice in response to a voice signal generated by the voice synthesizer 145. In the preferred embodiment of the present invention, the voice is released through the amplifier 22 and the loudspeaker 23 in FIG. 1.

Figure 2:
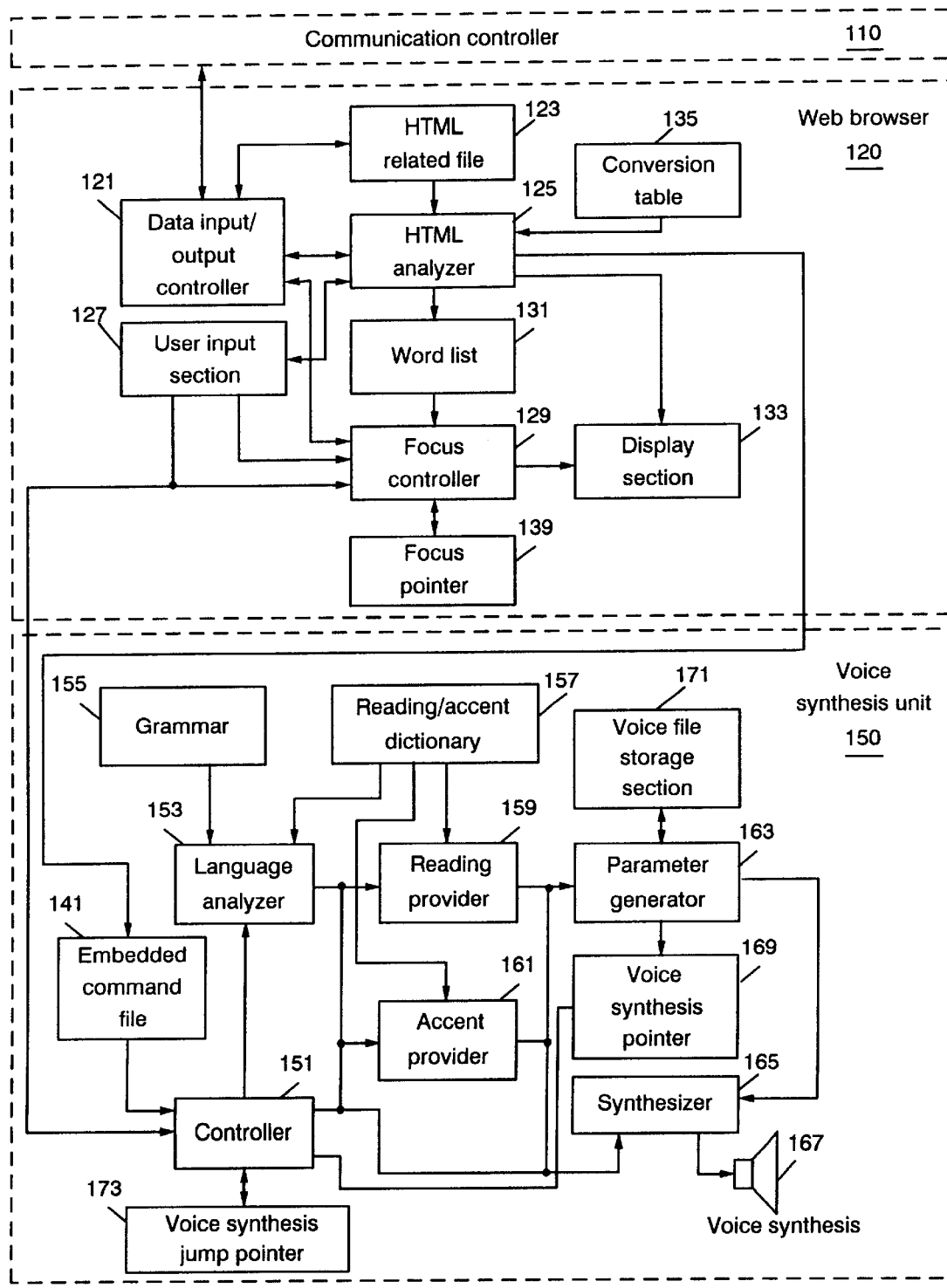
FIG. 2 is a block diagram illustrating processing components.

Although the functional blocks in FIG. 2 have been described, they are theoretical functional blocks. They are not always individually implemented by hardware or software, and can be provided by combined or common hardware or software.

Data Flow

An explanation will now be given for data exchange between the functional blocks that were described under the sub-heading "System Configuration."

Reception Of HTML Relating File

The communication control 110 controls communications with the Web server 60, as is shown in FIG. 3. In FIG. 3, first, information specifying a URL input at the user input section 127 is received via the input/output controller 121. Based on this information, the Web server 60 is accessed, and an HTML (Hyper Text Markup Language) file is received from the Web server 60.

The HTML file received by the communication controller 110 is stored in the HTML related file storage section 123. The HTML file is analyzed by the HTML analyzer 125. The HTML analyzer 125 analyzes the HTML file, and determines whether or not a file to be received, such as an image file, is still present. When a file to be received is present, the file name is specified and requested of the data input/output controller 121. The data input/output controller 121 again accesses the Web server 60 via the communication controller 110, and receives an HTML relating file from the Web server 60. The received HTML relating file is stored in the HTML related file storage section 123.

Producing The Word List

In FIG. 4 is shown a sample of an HTML file used in the preferred embodiment of the present invention. In this embodiment, the HTML file is input to produce a sentence including an embedded command. As is shown in FIG. 4, the HTML file in a text form includes tags, <TITLE>, <H1>, <H2>, <H3>, <H4>, <H5> and <H6>.

Figure 5:
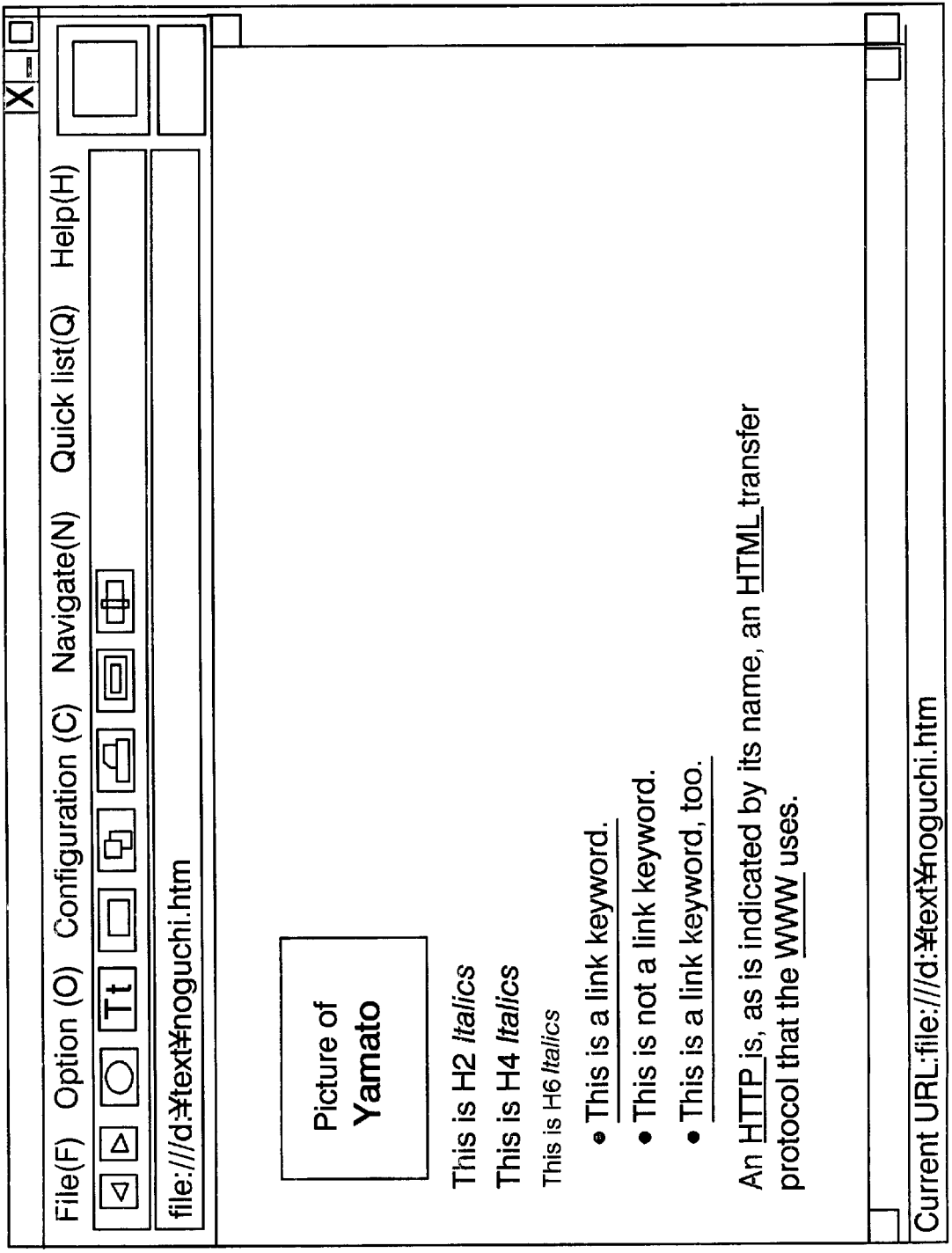
FIG. 5 is a diagram showing a user interface for a Web browser of the present invention.

The procedures for producing an embedded command file and a word list will be explained while referring to a sample of an HTML file. FIG. 4 is a diagram showing the contents of a sample HTML file in this embodiment. The HTML file in FIG. 4 is processed by the display section 133 and is shown to a user as a graphical image, as is shown in FIG. 5. The HTML tag begins with the start tag <XXXX> and ends with the end tab </XXXX>. Thus, the system can recognize the types of respective tags and can extract them.

A pointer 301 is a number allocated for a valid tag. In this embodiment, when there is an overlapping tag, such as "<html><TITLE>," only the last tag is valid and the other, preceding tags are ignored. For example, when "<H1>picture of Yamato</H1><IMG SRC=" yamato.gif"><H2>H2<I>Italics</I> This is" input, the tag, "</H1><IMG SRC ="yamato.gif">", is ignored. However, when the tag for a link keyword and the other tag overlap as in "<A HREF="THAT.HTM"><I>link keyword</I> This is also </A>," the tab of the link keyword is not ignored, and a list without a word is formed.

Position information 303 indicates the start position for a word that relates to a valid tag. In a case where "<A HREF="THAT.HTM"><I>link keyword</I> This is also </A>", "<A HREF="THAT.HTM">" is detected and a link keyword flag indicating a word that relates to a link keyword is set to 1, and a link keyword head flag indicating a word that is the head of the link keyword is also set to 1. Further, in response to the word that is the head of the link keyword, link destination information is set. In this embodiment, the word list is generated by the HTML analyzer 125.

Although information in FIG. 6 is managed in the word list of this embodiment, not all of the information is required for the present invention. The word list 131 is for managing position information where a word related to a link keyword exists. When the position information where a word related to a link keyword exists is managed, the present invention can be operated.

Producing The Embedded Command File

The procedures for producing an embedded command file will now be explained. An embedded command in this preferred embodiment is produced by the HTML analyzer 125 by using following two procedures.

Producing The Tentative File

The HTML file shown in FIG. 4 is temporarily converted into a form shown in Table 1. Unnecessary information, such as "<html>" or "<IMG SRC="yamato.gif">," is removed from the HTML file, and the invalid start tab is converted into voice attribute information based on the text attribute/ voice attribute conversion table (conversion table 143). The end tag is converted into an embedded command to return the voice attribute, which has been changed by the related start tag, to a default value.

Although in the preferred embodiment of the present invention the conversion is performed by the conversion table 143, it can be performed by using the internal logic for a conversion program, instead of using the conversion table.

Table 1 shows one example of the text attribute/voice attribute conversion table.

TABLE 1

| (text attribute) | (voice attribute) | |
|---|---|---|
| default | S5P2G8Y5 | (speed 5, pitch 2, volume 8, intonation 5) |
| TITLE | S5P1G8Y6 | (speed 5, pitch 1, volume 8, intonation 6) |
| H1 (headline 1) | S5P3G8Y5 | (speed 5, pitch 3, volume 8, intonation 5) |
| H2 (headline 2) | S5P4G8Y5 | (speed 5, pitch 4, volume 8, intonation 5) |
| H3 (headline 3) | S5P5G8Y5 | (speed 5, pitch 5, volume 8, intonation 5) |
| H4 (headline 4) | S5P6G8Y5 | (speed 5, pitch 6, volume 8, intonation 5) |
| H5 (headline 5) | S5P7G8Y5 | (speed 5, pitch 7, volume 8, intonation 5) |
| H6 (headline 6) | S5P8G8Y5 | (speed 5, pitch 8, volume 8, intonation 5) |
| I (Italics) | S3 | (speed 3) |
| B (Bold) | G9 | (volume 9) |
| A HREF =(link keyword) | S1 | (speed 1) |

This table may be fixed or may be user alterable. When the same text attribute appears continuously, it may happen that the same voice attribute will be assigned and a user will not be able to identify it (the sentence can not be divided). When the same text attribute appears sequentially, therefore, different voice attributes can be alternately assigned, or oral reading can be performed at a constant interval to indicate separate parts of the sentence, or a plurality of voices can be inserted.

Figure 7:
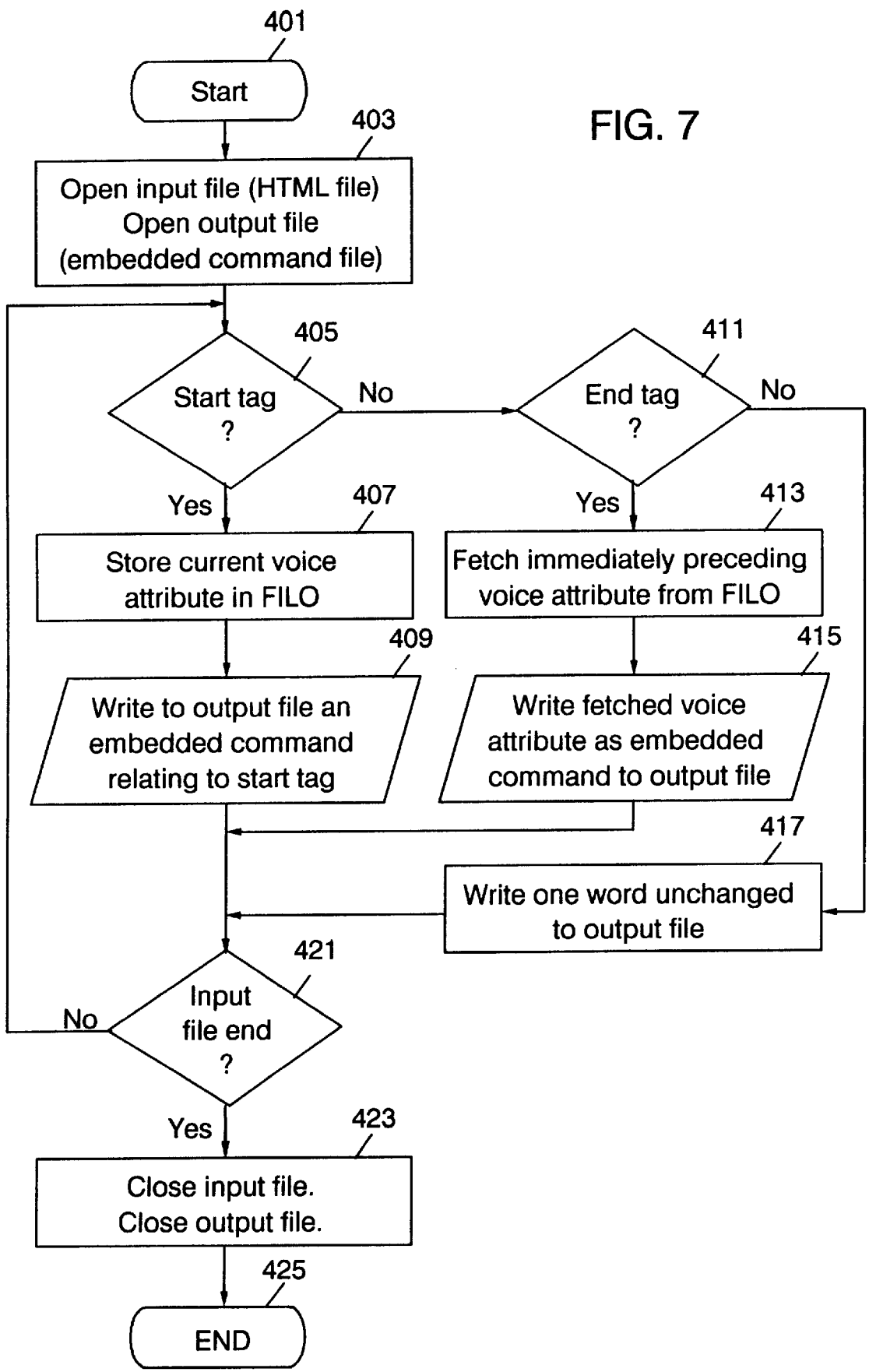
FIG. 7 is a flowchart showing the processing of the present invention for producing a sentence that includes an embedded command.

Table 2 is one example of a tentative file. The tentative file can be produced by a flowchart in FIG. 7. In this file, only a voice attribute for which the default voice attribute is changed is inserted as an embedded command. However, a complete voice command shown in Table 1, such as "[*S5P1G8Y6]a title[*S5P1G8Y6]," can be regarded as an embedded command.

[Table 2]
[*P1Y6]a title[*P2Y5]
[*P3]the picture of Yamato[*P2]
[*P4]H2[*Y8]Italics[*Y5]this is[*P2]
[*P6]H4[*Y8]Italics[*Y5]this is[*P2]
[*P8]H6[*Y8]Italics[*Y5]this is[*P2]
[*S1]This is a link keyword[*S5]
This is not a link keyword
[*S1]This is [*Y8]a link keyword[*Y5]too[*S5]
[*P7]
[*S1]HTTP[*S5] is, as is indicated by its name,
[*S1]an HTML[*S5] transfer protocol,
[*S1] that WWW [*S5] uses.
[*P2]

Final File

The embedded commands where the tentative files continue are arranged. In this case, when voice attributes of the same type exist, the last voice attribute is regarded as valid. The serial numbers, "D1," "D2," . . . , are inserted as embedded position (order) information in the respective embedded commands. The embedded position information corresponds to the pointer in the word list 131 in FIG. 6. Finally, the embedded command is transmitted to the voice synthesis unit 150 in the form shown in Table 3.

[Table 3]
[*P1Y6D1]This is a title
[*P3Y5D2]the picture of Yamato
[*P4D3]H2
[*Y8D4]Italics
[*Y5D5]This is
[*P6D6]H4
[*Y8D7]Italics
[*Y5D8]This is
[*P8D9]H6
[*Y8D10]Italics
[*Y5D11]This is
[*S1P2D12]This is a link keyword
[*S5D13]This is not a link keyword
[*S1D14]This is
[*Y8D15]a link keyword
[*Y5D16]too
[*S1P7D17]HTTP
[*S5D18]is as is indicated by its name
[*S1D19]an HTML
[*S5D20]transfer protocol
[*S1D21]that WWW
[*S5D22]uses.
[*P2D23]

The mode in which a set of the symbols indicating the types of the voice attributes and their voice attribute values is embedded into the voice command is merely an example. The symbols and the voice attribute values may be so embedded so long as the voice synthesis controller 151 of the voice synthesis unit 150 can determine that the command is a voice command, and can ascertain the type of a voice attribute embedded in the voice command, its attribute value, and the location in a sentence where the voice attribute is to be changed. The locations of the voice attribute values may be fixed, such that the first byte in a voice command indicates "gender" and the second byte indicates "speed," and the voice synthesis controller 151 may determine the types of voice attributes in accordance with their locations.

It is preferable that an embedded command be placed at the head of a word that renders a voice attribute included in the command valid. However, so long as the position of the word that renders the voice attribute valid can be obtained from the sentence, the embedded command does not have to be placed at the head of the word. In this case, embedded in a voice command is the position in the sentence of a word that renders valid the voice attribute embedded in the voice command, and the voice synthesis controller 151 can render the voice attribute in the voice command valid when the synthesizing at the position in the sentence of the word that renders the voice attribute embedded in the voice command valid.

In the preferred embodiment of the present invention producing a sentence that includes an embedded command is a two step procedures. However, position information can be embedded in a command at the step for producing a tentative file and this file can be used as a final file, or an HTML file can be converted at a conversion step into a final file in which an embedded command is included. Further, a sentence in which a word list and an embedded command are included can be produced in the same procedure.

Voice Synthesis

The language analyzer 153 refers to the reading/accent dictionary 157 and the grammar stored in the grammar holding section 155 to perform morphemic analysis of a word received by the voice synthesis controller 151, and an input sentence to obtain appropriate morphemes. Although this division may be performed by a unit in which a command is embedded, in this embodiment, a word that ignores an embedded command is used to perform morphemic analysis.

Therefore, when word "[*S1P7D17]HTTP[*S5D18]is as is indicated by its name," is input, voice synthesis is performed for the units "HTTP is/as is/indicated by/its name," instead of "HTTP/is/as is/indicated by/its name."

In the above case, the form of the data transmission to the parameter generator 163 can be changed at the design stage, for example: "[*S1P7D17]HTTP/[*S5D18]is/as is/indicated by/its name" or "[*S1P7D17]HTTP is/[*S5D18]as is/indicated by/its name].

In the preferred embodiment of the present invention, an embedded command for a default voice attribute is inserted after the change of the voice attribute has been completed. However, the present invention can be implemented by inserting an embedded command only into a word for which the voice attribute should be changed by inserting a special word or symbol indicating a change in the voice attribute has been completed, into the location where such a change is effected, and by the parameter generator 163 detecting the special word to automatically generate a parameter for a default voice attribute. In this case, the parameter generator 163 generates a voice parameter to synthesize by using currently specified parameters, "speed," "pitch," "volume," "intonation" and "gender," in accordance with the reading that is determined by the reading provider 159 and the accent determined by the accent provider 161. When a voice command indicating a voice attribute is embedded in front of a word for synthesizing, that voice attribute is adopted for the "currently designated parameters." When such a voice command does not exist, a default voice attribute value that is set for the system in advance is used for the "currently designated parameters."

The voice synthesizer 165 generates a voice signal in accordance with the voice parameter produced by the parameter generator 163. In the preferred embodiment of the present invention, this generation is conducted by the D/A (digital/analog) conversion at the audio controller 21 in FIG. 1. The voice generator 167 produces a voice that relates to the voice signal generated by the voice synthesizer 165. In this embodiment, this is implemented by the amplifier 22 and the loudspeaker 23 in FIG. 1. Since the voice synthesization is performed in response to the type of a special word that is included in the text, a user can identify the type of the special word nearly by listening and without using vision, so that he or she can understand the contents of the text.

Although, in this embodiment, the type of a special word is expressed by the alternation of the voice attribute, it is possible for a visually impaired user to recognize the type of a word without relying on a change in the voice attribute. Table 4 shows one example of a sentence in which is embedded the embedded command of the present invention. In this example, the word "link keyword" is inserted immediately before an actual link keyword to enable a visually impaired user to identify the position of the link keyword. Voice attribute command "FM1" in this table is a command to instruct to change to a female voice when the oral reading is currently being performed using a male voice, and to instruct to change to a male voice when the reading is performed using a female voice. With this command, it is possible to identify the word whether it is a word "link keyword" that originally existed in the HTML file, or whether it is a word "link keyword" that has been inserted.

[Table 4]
[*D1]This is a title
[*D2]the picture of Yamato
[*D3]H2
[*D4]Italics
[*D5]This is
[*D6]H4
[*D7]Italics
[*D8]This is
[*D9]H6
[*D10]Italics
[*D11]This is
[*S1FM1D12]link keyword
[*D12]This is a link keyword
[*S5FM1D13]This is not a link keyword
[*S1FM1D14]link keyword
[*D14]This is
[*D15]a link keyword
[*D16]too
[*S1FM1D17]link keyword
[*D17]HTTP
[*S5FM1D18]is as is indicated by its name
[*S1FM1D19]link keyword
[*19]an HTML
[*S5FM1D20]transfer protocol
[*S1FM1D21]link keyword
[*D21]that WWW
[*S5FM1D22]uses.

Special Word Focusing Synchronization

In the preferred embodiment of the present invention, the focus controller 129 in the Web browser 120 knows the location at which the reading is currently performed. More specifically, the parameter generator 163 manages a voice information file 171 for which the reading and the accent are provided and that is divided into morphemes, and the above described position information relates to each morpheme. The parameter generator 163 transmits voice files to the voice synthesizer 165 as morphemic units in accordance with the operation of a first-in and first-out system. The parameter generator 163 stores, as a voice synthesis pointer 169, the position information related to the morphemic units of the voice files. The focus controller 129 of the Web browser 120 can obtain the information for the voice synthesis pointer 169 via the voice synthesis controller 151 in the voice synthesis unit 150.

The process sequence will be described by employing the previously described embedded command file. For a word block of "[*D17]an HTTP[*S5D18] is as is indicated by its name," the following voice information, for which the reading and the accent are provided by the reading provider 159 and the accent provider 161, is transmitted to the parameter generator 163.

"[*D17]an HTTP is, [*S5D18] as is, indicated by, its name," (the accents symbols are omitted here.)

The parameter generator 163 converts this information into a web form file in which a parameter is set that is in accordance with the voice attribute of the embedded command, and stores it in the voice file storage section 171. The stored voice file can be expressed as follows.

"[*D17]an HTTP is, [*D18]as is, [*D18] indicated by, [*D18]its name,"

To read "as is," for example, the parameter generator 163 transmits this voice file to the voice synthesizer 165, and sets the value for "D" (e.g., 18) to the voice synthesis pointer 169. The position information is not necessarily held by the units of morphemes, and the morphemes "[*D17]an HTTP [*D18]is, as is, indicated by, its name" can be separately embedded.

The focus controller 129 receives the information for the voice synthesis pointer 169 via the voice synthesis controller 151. Based on this information, the focus controller 129 refers to the word list, searches for an entry of 18 indicated by the pointer 301, and is aware that the 100th word "is as indicated by its name" is being read.

The focus controller 129 transmits the position information for the word list to the display section, which then displays the location where the reading is currently performed in such a way, such as by employing highlighting in a display, that a user can easily identify it. The highlighting in the display is performed in synchronization with the voice synthesization, and controls, such as an insertion of a delay time, can be performed.

Link Function

According to the present invention, a link keyword is specified that is related to the location where the reading is performed. When the keyword is selected, the process jumps to a link destination that relates to the keyword. More specifically, the focus controller 129 compares the voice synthesis pointer 169 with the pointer information and the link head flag information, in the word list 131, to specify the link destination 311 information relates to the location where the reading is being performed. When, for example, the voice synthesis pointer indicating the location where the reading is performed is "16," the focus controller 129 selects a pointer that has a maximum value that is less than 16 and that has a link head flag set to "1."

In this case, "14" is selected. The focus controller 129 stores the pointer information in the focusing pointer 139. Since the pointer information is used to specify the link destination, link destination information, such as "THAT.HTM," can be stored directly. In this embodiment, the focus controller 129 selects a pointer that has a maximum value less than the value of the voice synthesis pointer and having a link head flag set to "1," and stores the selected pointer as a focus pointer. When such a pointer does not exist, a pointer that has the smallest value and that has a link head flag set to "1" is stored as a focus pointer.

When key input instructing a "jump to a link destination" has been detected during the reading, link destination information that relates to the focus pointer can be specified. The link method can be used for conventional hyper text to jump to the link destination for its keyword. Therefore, while listening to a voice, a visually impaired user need only perform a simple manipulation to jump to a link destination and to continue the reading of the hyper text. In the preferred embodiment of the present invention, in response to the detection of the above user's input, the contents of a buffer stored in various files, such as the embedded command file 141 and the voice file 171, are cleared, and various types of information, such as the focus pointer 139, the voice synthesis pointer 169 and the voice jump pointer 173, are initially set.

Other Functions

In the preferred embodiment of the present invention, the movement and selection of the link keyword can be freely performed by allocating keys having the following functions on the keyboard.

key 1: reading of link keyword focused on
key 2: reading beginning at link keyword focused on
key 3: jump to link destination
key 4: forward movement of link keyword
key 5: backward movement of link keyword
key 6: play
key 7: stop
key 8: pause
key 9: fast forward
key 10: fast rewind
key 11: reading only of link keyword focused on Keys 6 though 10 can be provided by using the conventional method, and key 3, jump to the link destination, has been previously described. Thus, only keys 1 through 5 and 11 will now be explained.

When key 1 is depressed, the user input section 127 detects this event, and transmits this information to the focus controller 129. Upon receipt of this information, the focus controller 129 obtains pointer information stored in the focus pointer 139. In addition, the focus controller 129 refers to the word list 131 to specify a word to be orally read. When, for example, the contents of the focus pointer is "14," it is ascertained, by referring to the link flag, that succeeding words "14" through "16" that have link flags that are set to "1" and link head flags that are not set to "1" are those to be read.

The focus controller 129 instructs the voice synthesis controller 151 to synthesize for words whose position information is 14 through 16. The voice synthesis controller 151 temporarily stores, as the voice jump pointer 173, the start position and the end position of the position information for which voice synthesis should be performed. Since words that relate to one link destination continuously exist, the start position and the number of words may be stored instead of the start position and the end position. Further, since the number of words and the end position are data that are available by referring to the link flag and the link head flag in the word list, only the start position may be stored.

The voice synthesis controller 151 examines the contents of the voice synthesis file storage section 171 to determine whether or not a voice file having the position information is present. When such a voice file remains, a corresponding voice file is extracted (voice files except for the corresponding voice file may be erased from the voice file storage section 171), and only voice files whose position information is 14 to 16 are transmitted to the synthesizer 165. When no corresponding voice file is found, the voice file storage section 171 is cleared, a corresponding embedded command is extracted from the embedded command file, and voice synthesization is performed to read a specified link keyword.

When key 2 is depressed, almost the same procedures are performed as for the key 1. When key 2 is depressed, the user input section 127 detects this event, and transmits it to the focus controller 129. In response to this, the focus controller 129 obtains pointer information stored in the focus pointer 139. Further, the focus controller 129 refers to the word list 131 to specify a word to be orally read. When, for example, the contents of the focus pointer is "14," it is ascertained that words whose position information is "14" to "9999" ("9999" indicates the last sentence in this embodiment) are those to be read.

The focus controller 129 instructs the voice synthesis controller 151 to synthesize for words whose position information is 14 through 9999. The voice synthesis controller 151 temporarily stores, as the voice jump pointer 173, the start position and the end position for the position information for which voice synthesis should be performed. The voice synthesis controller 151 examines the contents of the voice synthesis file storage section 171 to determine whether or not a voice file having the position information "14" is present. When such a voice file is found, voice files that do not correspond are ignored (or abandoned from the voice file storage section 171), and only voice files whose position information is 14 or greater are transmitted to the synthesizer 165. When no corresponding voice file exists, the voice file storage section 171 is temporarily cleared, and voice synthesization is performed for embedded commands, of an embedded command file, for which the position information is 14 or greater, so that reading beginning at a specified link keyword is performed.

When key 4 is depressed, almost the same procedures are performed as for key 2. When key 4 is depressed, the user input section 127 detects this event, and transmits it to the focus controller 129. In response to this, the focus controller 129 obtains pointer information stored in the focus pointer 139. Further, the focus controller 129 refers to the word list 131 to search for a word having a link head flag that is set to 1 and maximum position information that is smaller than a focus pointer. When, for example, the contents of the focus pointer is "14," it is ascertained that a word whose position information is "12" is the one to be read.

The focus controller 129 instructs the voice synthesis controller 151 to synthesize for words whose position information is 12 through 9999. The voice synthesis controller 151 temporarily stores, as the voice jump pointer 173, the start position and the end position for the position information for which voice synthesis should be performed. The voice synthesis controller 151 examines the contents of the voice synthesis file storage section 171 to determine whether or not a voice file having the position information "12" is present. When such a voice file is found, voice files that do not correspond are ignored (or erased from the voice file storage section 171), and only voice files whose position information is 12 or greater are transmitted to the synthesizer 165. When no corresponding voice file is found, the voice file storage section 171 is temporarily cleared, and voice synthesization is performed for embedded commands, of an embedded command file, for which the position information is 12 or greater, so that reading beginning at a specified link keyword is performed.

When key 5 is depressed, the focus controller 129 searches the word list 131 for a word that has a link head flag that is set to 1 and for which the position information is the smallest of those greater than the focus pointer. The remaining process is the same as for key 4.

When key 11 is depressed, the user input section 127 detects this event, and transmits it to the focus controller 129. In response to this, the focus controller 129 refers to the word list 131 to specify a word to be read. In other words, all of the words that have a link flag set to 1 are extracted.

In the preferred embodiment of the present invention, a word, which succeeds the word whose link head flag is 1, that has a link flag set to 1 and a link head flag not set to 1, is determined to be a link keyword that carries a meaning. A word or a command to instruct a reading interval, such as a constant blank period, is inserted between meaningful link keywords, so that a silent period during which oral reading is not performed for a constant time interval is formed between the meaningful link keywords.

The focus controller 129 produces a new embedded command file, and instructs the voice synthesis controller 151 to clear a currently stored voice file and to perform voice synthesization for the new embedded command file. Instead of producing a new embedded command, the above described process can be performed when the voice synthesizer extracts a word, for which voice synthesization should be performed, from an embedded command file that is currently stored in the voice synthesis unit 150, and synthesize for that word.

The above described keyword control requiring key input can be replaced with a link keyword control employing voice in put that uses a conventional voice recognition method. In this case, in addition to the user input section 127 in FIG. 2, a voice recognizer is provided that receives oral input by a user, such as a "link keyword" and "jump," that takes the place of the key input, identifies the input, and transmits to the focus controller 129 an instruction that corresponds to the identified input type. When oral input by the user is employed, it is preferable that a time be set for accepting user input and that voice synthesis be halted during that time. However, so long as an environment is provided wherein voice output does not affect the oral input, such as when a user uses a headphone and a microphone, the oral input and the voice output can be performed at the same time.

As is described above, according to the present invention, while a visually impaired user is listening to a voice expressing the contents of a sentence, the user can understand the contents by identifying the differences between voice attributes, and can perform an adequate operation for hyper text.

The present invention can be employed when the contents of a data file having a text attribute or hyper text data are to be understood by employing a voice synthesis program. A visually impaired user, or a user whose situation is such that he can not look at a screen, can listen to a voice reciting the contents of a sentence, and understand them by identifying the differences between voice attributes. As most of the WWW data on the Internet are provided as sentence data, when this data is orally read, a very large amount of WWW data can be obtained by vocal recitation.

I claim as my invention:

1. Apparatus for use with an HTML file that includes a plurality of link keywords, wherein position information and destination information are associated with each of the link keywords, and wherein each the link keywords is bounded by a start tag and an end tag, the apparatus comprising:

a communication controller for receiving an HTML file;

means for producing a word list that includes link keywords from the HTML file, and corresponding position information for each of the link keywords;

means for converting the start tag and the end tag of each of the link keywords into voice attribute information, and for correlating the voice attribute information with the position information of the corresponding link keyword to produce a voice attribute embedded command file;

a voice synthesizer for converting, using the voice attribute information in the voice attribute embedded command file, the link keywords into speech;

means for obtaining voice synthesis pointer information that corresponds to the link keyword currently being synthesized;

means for determining the destination information corresponding to the voice synthesis pointer information;

means for detecting a user input; and means for accessing, in response to the user input, the link destination currently selected by the means for determining the destination information.

2. Apparatus for use with hyper text that includes a plurality of link keywords, wherein each of the link keywords includes corresponding link destination information, the apparatus comprising:

means for producing a word list that includes link keywords and corresponding position information for the link keywords in the hyper text;

means for producing voice synthesis input information that includes voice attribute information for the link keywords in the hyper text;

synthesizing means for synthesizing, using the voice attribute information, the link keywords into speech;

means for obtaining voice synthesis pointer information corresponding to the link keyword currently being synthesized;

means for determining, using the voice synthesis pointer information, the destination information that corresponds to the link keyword currently being synthesized;

means for detecting a user input instruction to jump to the link destination of the link keyword currently being systhesized; and means for accessing, in response to the user input, the link destination currently selected by the means for determining.

3. Apparatus for synthesizing a sentence including a plurality of special words, comprising:

means for producing a word list managing information for specifying the plurality of special words and position information for specifying a position of the plurality of special words in the sentence;

means for producing voice synthesis input information by relating a voice attribute with each of the special words, and by converting the sentence;

means for synthesizing the voice synthesis input information;

means for obtaining a voice synthesis pointer information related to a position in the sentence related to a position currently synthesized;

means for determining a special word related to a position currently synthesized by searching a position information in the sentence related to the voice synthesis pointer information in the word list;

means for detecting user input instructing to change the voice synthesis position;

means for obtaining, in response to the user input, from the word list a position information for special word adjacent to a specific word related to a position currently synthesized; and means for synthesizing at a position related to the position information adjacent to special word.

* * * * *